(12) United States Patent
Huang

(10) Patent No.: US 6,913,035 B2
(45) Date of Patent: Jul. 5, 2005

(54) WATER FILLER FOR WATER TANK

(76) Inventor: So-Mel Huang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/730,722

(22) Filed: Dec. 5, 2003

(65) Prior Publication Data

US 2005/0121079 A1 Jun. 9, 2005

(51) Int. Cl.$^7$ .................. F16K 31/26; F16K 33/00
(52) U.S. Cl. .............. 137/444; 137/425; 137/426; 137/432
(58) Field of Search .................. 137/414, 430, 137/432, 436, 437, 442, 443, 444, 425, 426; 4/415; 73/322.5

(56) References Cited

U.S. PATENT DOCUMENTS

| | | | | |
|---|---|---|---|---|
| 2,911,000 A | * | 11/1959 | Doyle | 137/414 |
| 3,693,649 A | * | 9/1972 | Gordon et al. | 137/414 |
| 4,286,619 A | * | 9/1981 | Straus | 137/426 |
| 4,887,635 A | * | 12/1989 | Johnson | 137/426 |
| 5,255,703 A | * | 10/1993 | Johnson | 137/426 |
| 5,439,025 A | * | 8/1995 | Johnson | 137/426 |
| 5,769,111 A | * | 6/1998 | Han | 137/432 |
| 5,975,125 A | * | 11/1999 | Nichols-Roy | 137/436 |
| 6,155,288 A | * | 12/2000 | Johnson | 137/426 |
| 6,510,866 B2 | * | 1/2003 | Li | 137/426 |
| 6,666,228 B1 | * | 12/2003 | Li | 137/426 |
| 6,679,285 B2 | * | 1/2004 | Pablo | 137/414 |
| 6,679,287 B2 | * | 1/2004 | Huang | 137/444 |
| 6,755,209 B2 | * | 6/2004 | Wey | 137/414 |

\* cited by examiner

Primary Examiner—Kevin Lee
(74) Attorney, Agent, or Firm—Alan D. Kamrath; Nikolai & Mersereau, P.A.

(57) ABSTRACT

A water filler includes a water filling device, and a regulating device. The water filling device includes an inner filling tube, an outer filling tube, and an upper cover. The regulating device includes a floating barrel, a sliding barrel, a water support disk, and an adjusting unit. Thus, the floating barrel is lifted instantaneously and rapidly to stop the water filling action exactly and actually, thereby saving the water source. Thus, the water filler has a quick water stop function.

15 Claims, 7 Drawing Sheets

WATER FILLER FOR WATER TANK

BACKGROUND OF THE INVENTION

1. Field of the Invention

The present invention relates to a water filler for a water tank, and more particularly to a water filler having a quick water stop function.

2. Description of the Related Art

A conventional water filler 1 in accordance with the prior art shown in FIG. 1 is mounted in a water tank 4 and comprises an inner filling tube 11 mounted in the water tank 4 to supply the water into the water tank 4, an outer filling tube 12 mounted on the inner filling tube 11 and having an upper end formed with a water outlet 121 communicating with the inner filling tube 11, a floating barrel 13 movably mounted on the outer filling tube 12, a support bar 14 adjustably mounted on the floating barrel 13 by a control unit 15, and a press plate 16 having a first end pivotally mounted on an upper end of the support bar 14 and a second end 161 pivotally mounted on the upper end of the outer filling tube 12. Thus, when the water level in the water tank 4 reaches a predetermined height, the second end 161 of the press plate 16 is moved by pivot of the press plate 16 to block the water outlet 121 of the outer filling tube 12 so as to stop the water filling action.

However, the water level in the water tank 4 is lifted slowly, so that the second end 161 of the press plate 16 cannot be moved rapidly to block the water outlet 121 of the outer filling tube 12 so as to stop the water filling action rapidly, thereby causing water consumption.

SUMMARY OF THE INVENTION

The primary objective of the present invention is to provide a water filler for a water tank of a toilet.

Another objective of the present invention is to provide a water filler having a quick water stop function.

A further objective of the present invention is to provide a water filler, wherein the floating barrel is lifted instantaneously and rapidly to stop the water filling action exactly and actually, thereby saving the water source.

In accordance with the present invention, there is provided a water filler, comprising a water filling device, and a regulating device, wherein:

the water filling device includes an inner filling tube, an outer filling tube, and an upper cover;
the outer filling tube is mounted on the inner filling tube and has an upper end having a center formed with a water inlet communicating with the inner filling tube;
the upper cover is mounted on the outer filling tube, the upper cover has a top formed with a water outlet and has an inner wall formed with a chamber communicating with the water outlet, the chamber of the upper cover has a center formed with a guide column having a periphery formed with a plurality of channels each communicating with the chamber and each communicating with the water inlet of the outer filling tube;
the regulating device includes a floating barrel, a sliding barrel, a water support disk, and an adjusting unit;
the floating barrel is movably mounted on the outer filling tube and has an inside formed with a hollow chamber having a first side formed with a through hole mounted on the outer filling tube and a second side formed with a guide track and an opening communicating with the guide track, the inside of the floating barrel has an upper portion formed with an outer chamber, a lower portion formed with an inner chamber and a mediate portion formed with a passage communicating with the outer chamber and the inner chamber;
the sliding barrel is movably mounted in the inner chamber of the floating barrel and has an upper portion provided with a recessed connecting portion mounted in the passage of the floating barrel;
the water support disk is movably mounted in the outer chamber of the floating barrel and has a bottom rested on a bottom of the outer chamber of the floating barrel to block the passage of the floating barrel;
the adjusting unit includes a support bar, and a press plate;
the support bar is adjustably mounted in the guide track of the floating barrel; and
the press plate is pivotally mounted on the upper cover and the support bar and has a first end which is moved by pivot of the press plate to block the water outlet of the upper cover.

Further benefits and advantages of the present invention will become apparent after a careful reading of the detailed description with appropriate reference to the accompanying drawings.

DETAILED DESCRIPTION OF THE INVENTION

Figure 1:
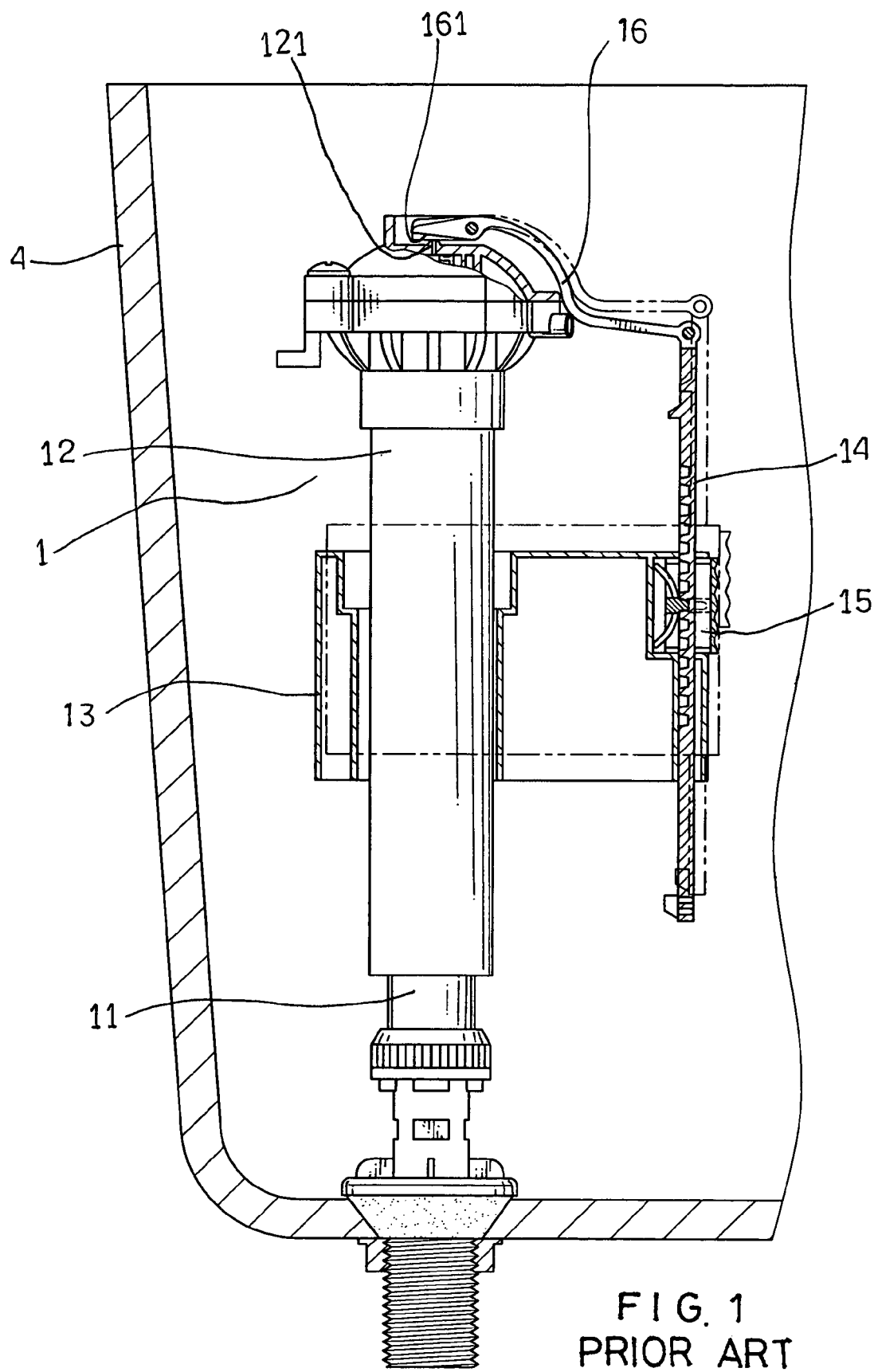
FIG. 1 is a partially plan cross-sectional view of a conventional water filler in accordance with the prior art.
Figure 2:
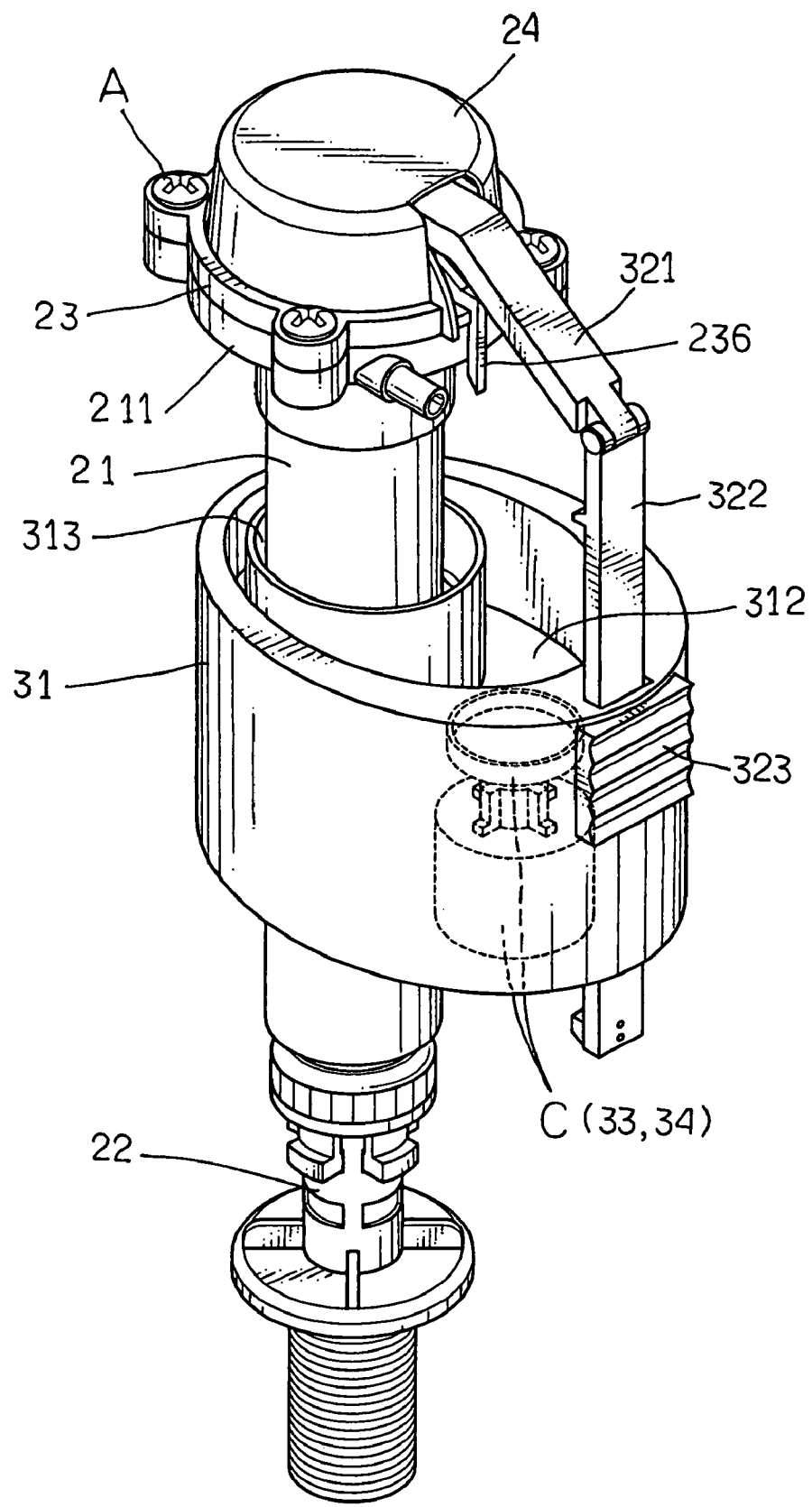
FIG. 2 is a perspective view of a water filler in accordance with the preferred embodiment of the present invention.
Figure 3:
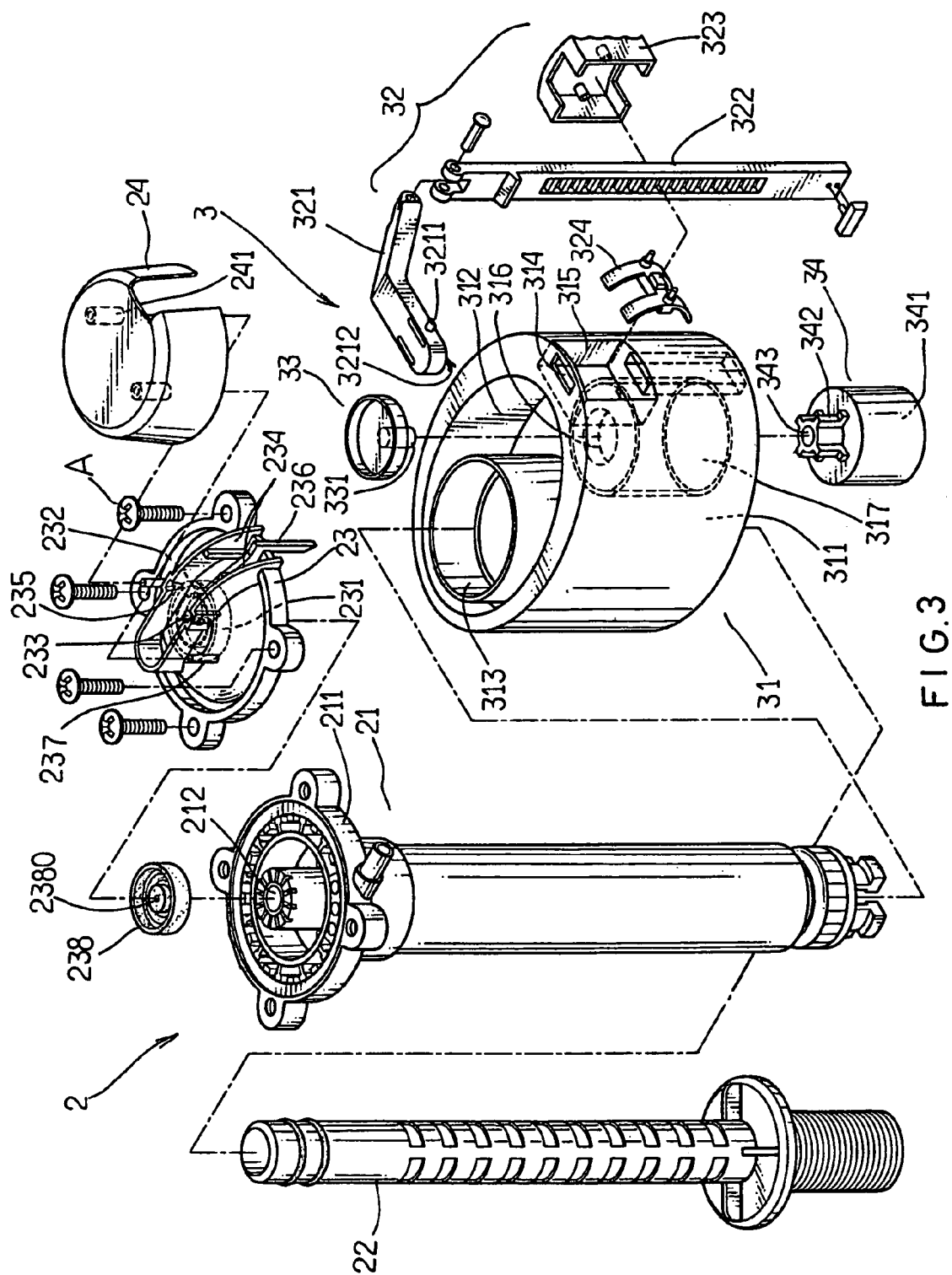
FIG. 3 is an exploded perspective view of the water filler in accordance with the preferred embodiment of the present invention.

Referring to the drawings and initially to FIGS. 2–5, a water filler in accordance with the preferred embodiment of the present invention is mounted in a water tank 4 and comprises a water filling device 2, and a regulating device 3.

The water filling device 2 includes an inner filling tube 22, an outer filling tube 21, an upper cover 23, and an outer cover 24.

The inner filling tube 22 is mounted in the water tank 4 to supply the water into the water tank 4.

The outer filling tube 21 is mounted on the inner filling tube 22 and has an upper end having a center formed with a water inlet 212 communicating with the inner filling tube 22 and a periphery formed with a flange 211.

The upper cover 23 is mounted on the flange 211 of the outer filling tube 21 by a plurality of screws A. The upper cover 23 has a top formed with a water outlet 233 and has an inner wall formed with a chamber 231 communicating with the water outlet 233. A sealing gasket 238 is mounted in the chamber 231 of the upper cover 23. The chamber 231 of the upper cover 23 has a center formed with a guide column 232 extended through a through hole 2380 formed in the sealing gasket 238 and having a periphery formed with a plurality of channels 2321 each communicating with the chamber 231 and each communicating with the water inlet 212 of the outer filling tube 21. The top of the upper cover 23 is formed with two connected side walls 234 each formed with a pivot hole 235, and a guide lever 236 located between the two side walls 234 and having a first end located adjacent to the water outlet 233 and a second end extended outward from the upper cover 23. The top of the upper cover 23 is provided with a plurality of studs 237.

The outer cover 24 is mounted on the upper cover 23 and is provided with a plurality of hollow mounting posts 241 mounted on the studs 237 of the upper cover 23.

The regulating device 3 includes a floating barrel 31, a sliding barrel 34, a water support disk 33, and an adjusting unit 32.

The floating barrel 31 is movably mounted on the outer filling tube 21 and has an inside formed with a hollow chamber 311 having a first side formed with a through hole 313 mounted on the outer filling tube 21 and a second side formed with a guide track 314 and an opening 315 communicating with the guide track 314. The inside of the floating barrel 31 has an upper portion formed with an outer chamber 312, a lower portion formed with an inner chamber 317 and a mediate portion formed with a passage 316 communicating with the outer chamber 312 and the inner chamber 317.

The sliding barrel 34 is movably mounted in the inner chamber 317 of the floating barrel 31 and has an upper portion provided with a recessed connecting portion 342 mounted in the passage 316 of the floating barrel 31 and having a center formed with a mounting hole 343. The sliding barrel 34 has an inside formed with a chamber 341.

Figure 4:
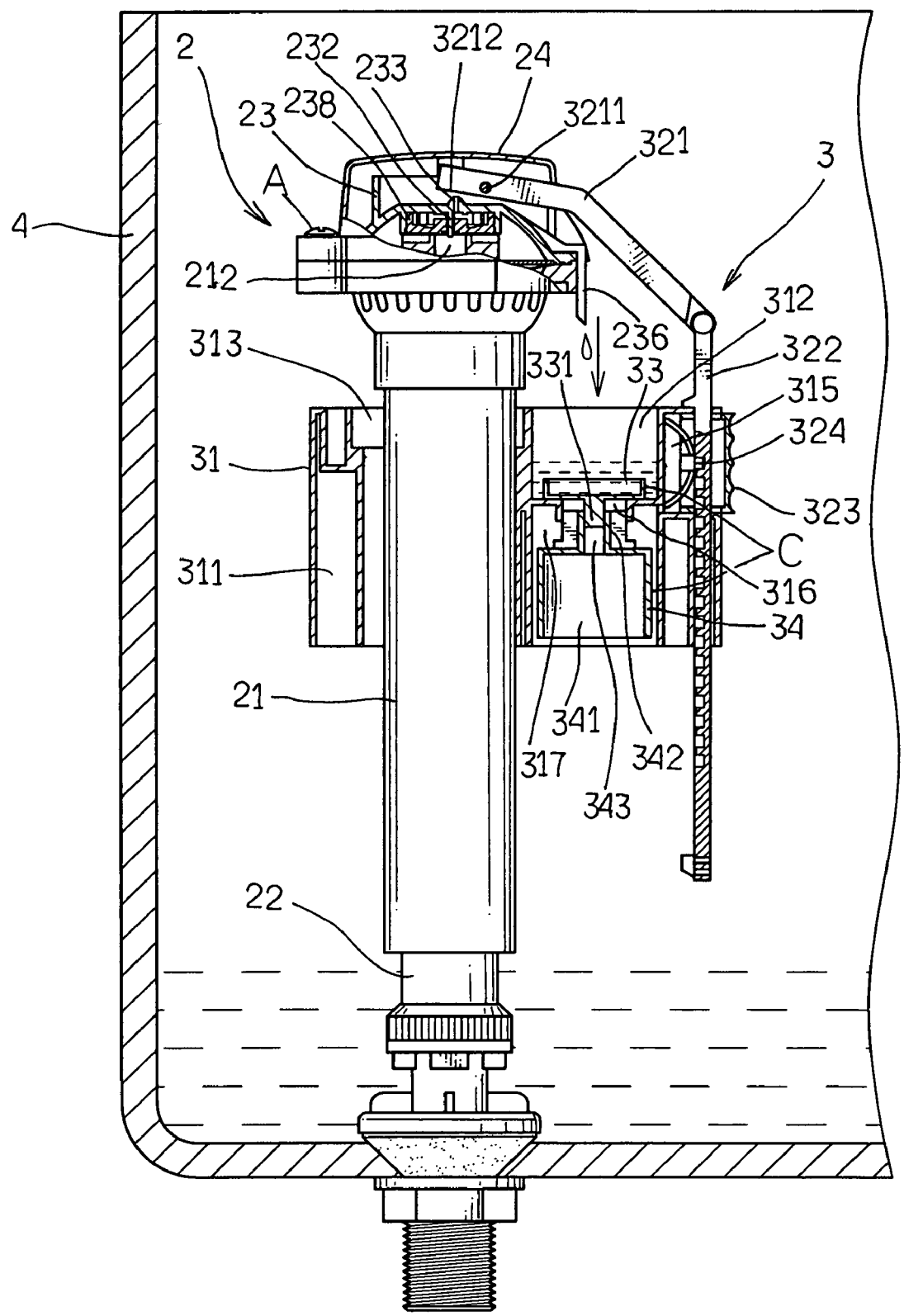
FIG. 4 is a partially plan cross-sectional assembly view of the water filler in accordance with the preferred embodiment of the present invention.
Figure 5:
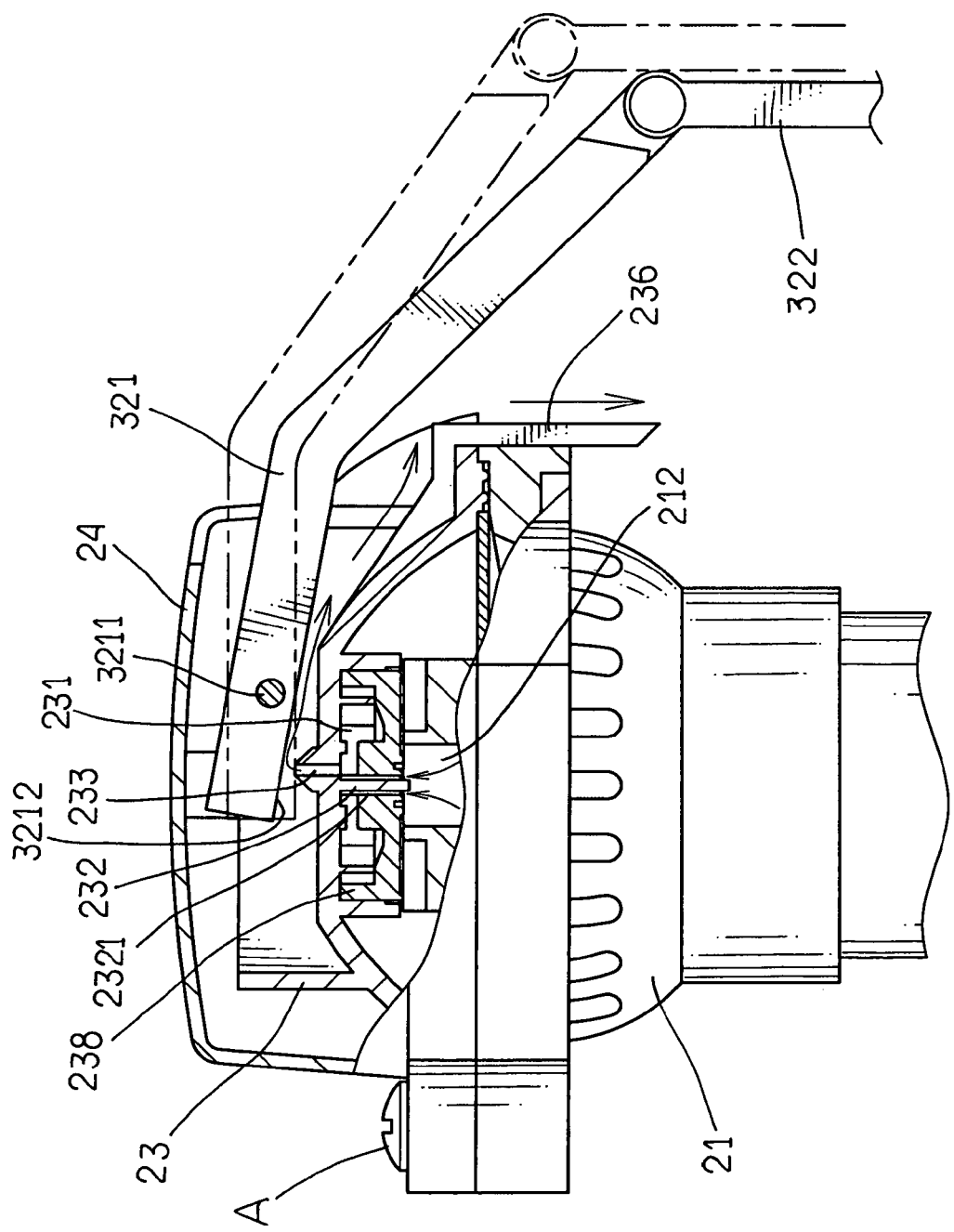
FIG. 5 is a partially enlarged operational view of the water filler as shown in FIG. 4.

The water support disk 33 is movably mounted in the outer chamber 312 of the floating barrel 31 and is aligned with the second end of the guide lever 236 as shown in FIG. 4. The water support disk 33 has a bottom rested on the bottom of the outer chamber 312 of the floating barrel 31 to block the passage 316 of the floating barrel 31. Preferably, the water support disk 33 has a diameter greater than that of the passage 316 of the floating barrel 31. The bottom of the water support disk 33 is formed with a downward extended protruding post 331 inserted into the mounting hole 343 of the connecting portion 342 of the sliding barrel 34, so that the water support disk 33 is combined with the connecting portion 342 of the sliding barrel 34 to form a water control unit C which is moved upward and downward by change of the water level of the water tank 4.

The adjusting unit 32 includes a positioning seat 324, a support bar 322, a press button 323, and a press plate 321.

The positioning seat 324 is made of an elastic material and is mounted in the opening 315 of the floating barrel 31.

The support bar 322 is adjustably mounted in the guide track 314 of the floating barrel 31 and is positioned by the positioning seat 324.

The press button 323 is movably mounted in the opening 315 of the floating barrel 31 and is urged on the positioning seat 324. Thus, when the press button 323 is pressed inward, the positioning seat 324 is pressed to detach from the support bar 322, so that the support bar 322 is movable in the guide track 314 of the floating barrel 31.

The press plate 321 is pivotally mounted on the upper cover 23 and has a first end 3212 which is moved by pivot of the press plate 321 to block the water outlet 233 of the upper cover 23. The press plate 321 has a second end pivotally mounted on an upper end of the support bar 322. The press plate 321 has two sides each provided with a pivot shaft 3211 pivotally mounted in the pivot hole 235 of a respective one of the two side walls 234 of the upper cover 23. The pivot shaft 3211 is located adjacent to the first end 3212 of the press plate 321.

In operation, referring to FIGS. 2–6, when the water filling device 2 mounted in the water tank 4 is disposed at the water filling state, a part of the water flow flows through the water inlet 212 of the outer filling tube 21, the channels 2321 of the guide column 232 and the chamber 231 of the upper cover 23, and then flow outward through the water outlet 233 of the upper cover 23. Then, the water flow is guided by the guide lever 236 to flow downward into the outer chamber 312 of the floating barrel 31.

At this time, the bottom of the water support disk 33 is rested on the bottom of the outer chamber 312 of the floating barrel 31 to block the passage 316 of the floating barrel 31, so that the water flow cannot flow through the passage 316 of the floating barrel 31 and is stored in the outer chamber 312 of the floating barrel 31 as shown in FIG. 4 so as to increase the weight of the floating barrel 31.

Figure 6:
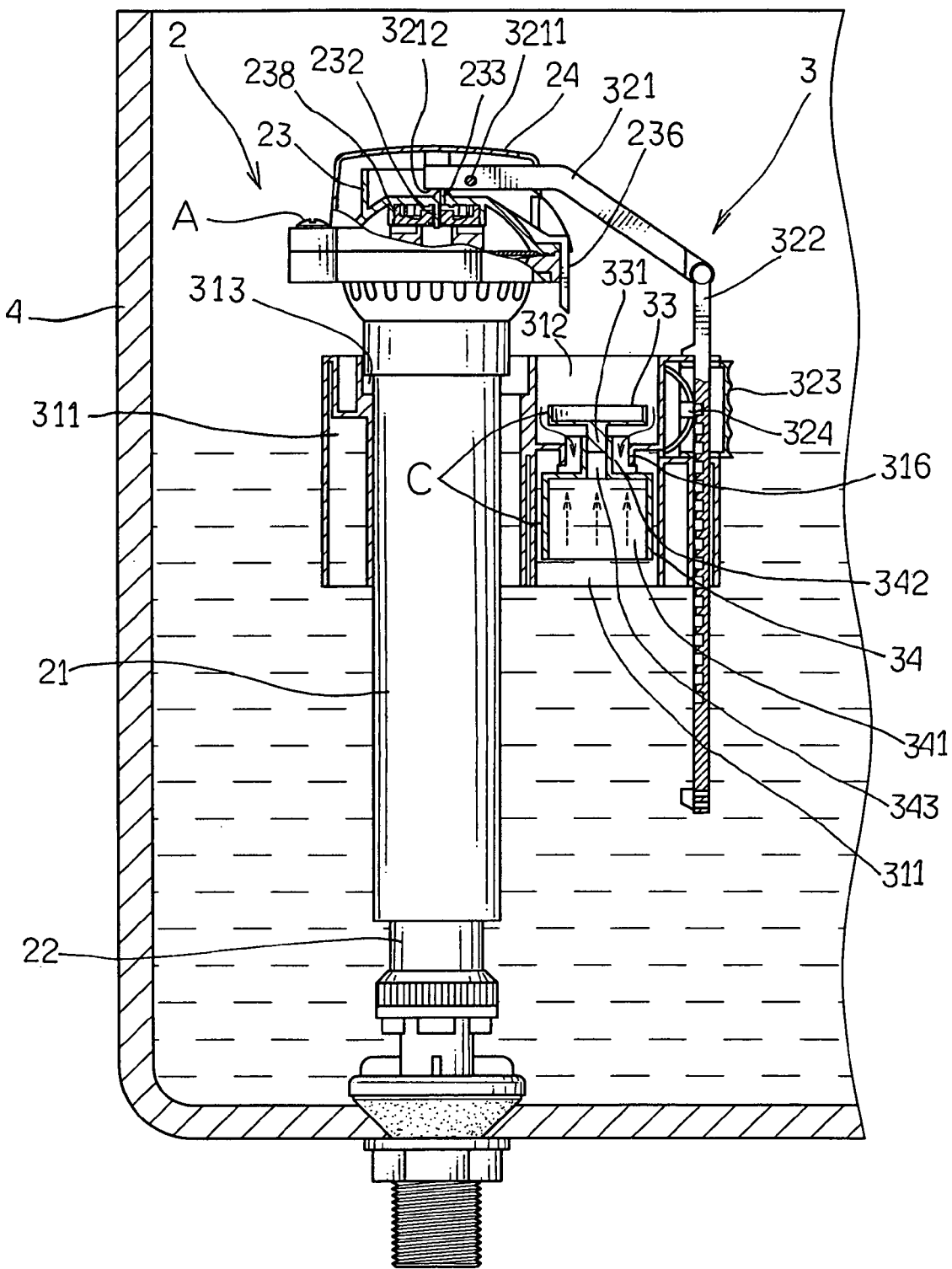
FIG. 6 is a schematic operational view of the water filler as shown in FIG. 4.

When the water in the water tank 4 is lifted and filled with the chamber 341 of the sliding barrel 34, the buoyancy applied on the sliding barrel 34 is much greater than the water weight stored in the outer chamber 312 of the floating barrel 31, so that the sliding barrel 34 is moved upward to detach the bottom of the water support disk 33 from the passage 316 of the floating barrel 31 as shown in FIG. 6, thereby connecting the outer chamber 312 of the floating barrel 31 with the inner chamber 317 through the passage 316. Thus, the water stored in the outer chamber 312 of the floating barrel 31 flows through the passage 316 into the inner chamber 317 of the floating barrel 31 and then flows into the water tank 4.

At the same time, the water load applied on the floating barrel 31 is released, and the floating barrel 31 is subjected to the buoyancy from the water in the water tank 4, so that the floating barrel 31 is lifted rapidly to lift the support bar 322 which drives and pivots the press plate 321 to move the first end 3212 of the press plate 321 to block the water outlet 233 of the upper cover 23 as shown in FIG. 6.

Accordingly, the floating barrel 31 is lifted instantaneously and rapidly to stop the water filling action of the water filling device 2 exactly and actually, thereby saving the water source.

Figure 7:
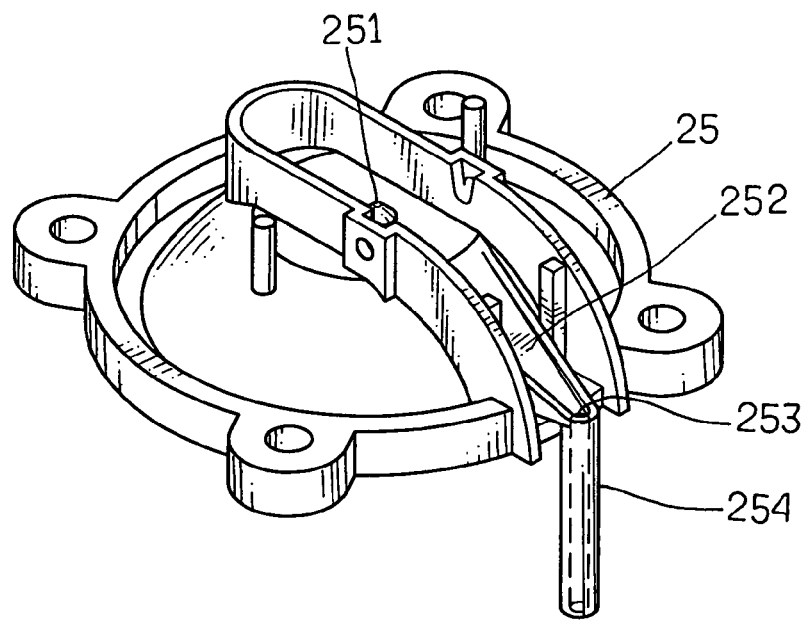
FIG. 7 is a perspective view of an upper cover of a water filler in accordance with another embodiment of the present invention.
Figure 8:
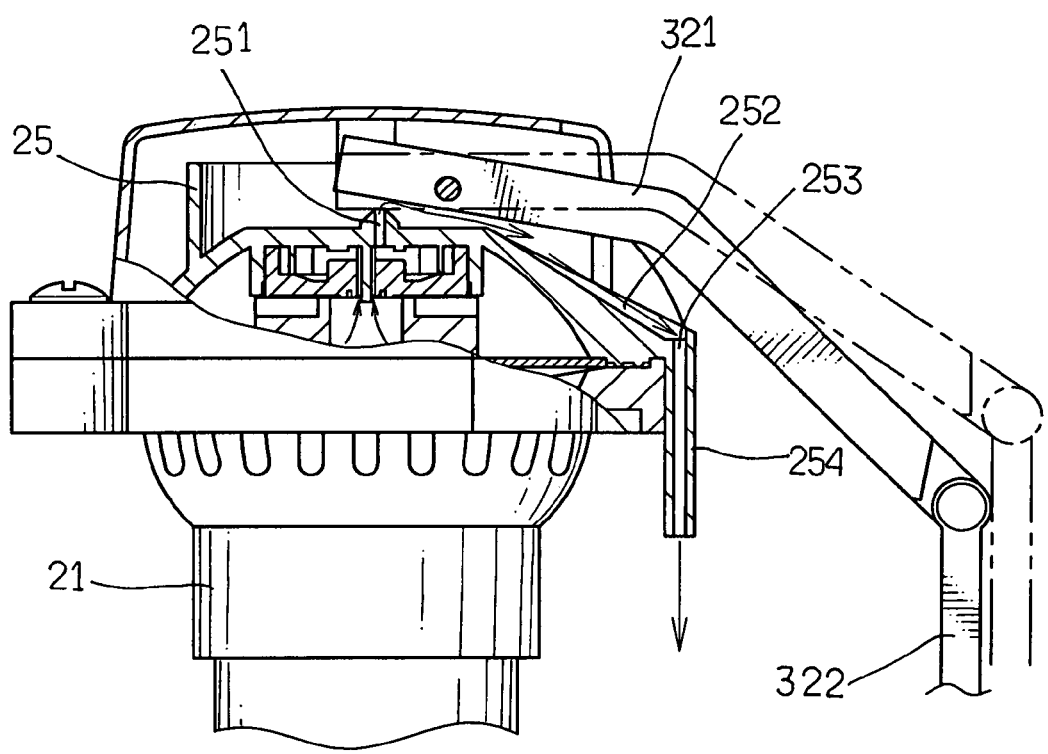
FIG. 8 is a plan cross-sectional operational view of the water filler as shown in FIG. 7.

Referring to FIGS. 7 and 8, the upper cover 25 is provided with an oblique guide channel 252 located adjacent to the water outlet 251, and a guide tube 254 mounted on a distal end 253 of the oblique guide channel 252 and directed toward the outer chamber 312 of the floating barrel 31, so that the water from the water outlet 251 is guided by the oblique guide channel 252 and the guide tube 254 into the outer chamber 312 of the floating barrel 31.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A water filler, comprising a water filling device, and a regulating device, wherein:
the water filling device includes an inner filling tube, an outer filling tube, and an upper cover;

the outer filling tube is mounted on the inner filling tube and has an upper end having a center formed with a water inlet communicating with the inner filling tube;

the upper cover is mounted on the outer filling tube, the upper cover has a top formed with a water outlet and has an inner wall formed with a chamber communicating with the water outlet, the chamber of the upper cover has a center formed with a guide column having a periphery formed with a plurality of channels each communicating with the chamber and each communicating with the water inlet of the outer filling tube;

the regulating device includes a floating barrel, a sliding barrel, a water support disk, and an adjusting unit;

the floating barrel is movably mounted on the outer filling tube and has an inside formed with a hollow chamber having a first side formed with a through hole mounted on the outer filling tube and a second side formed with a guide track and an opening communicating with the guide track, the inside of the floating barrel has an upper portion formed with an outer chamber, a lower portion formed with an inner chamber and a mediate portion formed with a passage communicating with the outer chamber and the inner chamber;

the sliding barrel is movably mounted in the inner chamber of the floating barrel and has an upper portion provided with a recessed connecting portion mounted in the passage of the floating barrel;

the water support disk is movably mounted in the outer chamber of the floating barrel and has a bottom rested on a bottom of the outer chamber of the floating barrel to block the passage of the floating barrel;

the adjusting unit includes a support bar, and a press plate;

the support bar is adjustably mounted in the guide track of the floating barrel;

the press plate is pivotally mounted on the upper cover and the support bar and has a first end which is moved by pivot of the press plate to block the water outlet of the upper cover;

the water support disk has a portion that is cooperably secured or associated with the recessed connecting portion that allows the sliding barrel and the water support disk to move as a single valve unit to control fluid flow through the passage of the floating barrel;

the adjusting support bar allows for the floating barrel to be adjusted at or to achieve different water levels;

the pivot press plate controls fluid flow from the upper cover, while allowing at least some of the water flow therefrom to flow into the outer chamber to add weight to the floating barrel to change its buoyancy, and relieving the weighted fluid through the passage of the floating barrel when a rising liquid level moves the sliding barrel and the water support disk to an open fluid flow position.

2. The water filler in accordance with claim 1, wherein the upper end of the outer filling tube has a periphery formed with a flange, and the upper cover is mounted on the flange of the outer filling tube by a plurality of screws.

3. The water filler in accordance with claim 1, wherein the water filling device further includes a sealing gasket mounted in the chamber of the upper cover, and the guide column is extended through a through hole formed in the sealing gasket.

4. The water filler in accordance with claim 1, wherein the top of the upper cover is provided with a plurality of studs, and the water filling device further includes an outer cover mounted on the upper cover and provided with a plurality of hollow mounting posts mounted on the studs of the upper cover.

5. The water filler in accordance with claim 1, wherein the sliding barrel has an inside formed with a chamber.

6. The water filler in accordance with claim 1, wherein the water support disk has a diameter greater than that of the passage of the floating barrel.

7. The water filler in accordance with claim 1, wherein the connecting portion of the sliding barrel has a center formed with a mounting hole, and the bottom of the water support disk is formed with a downward extended protruding post inserted into the mounting hole of the connecting portion of the sliding barrel, so that the water support disk is combined with the connecting portion of the sliding barrel to form a water control unit which is moved upward and downward by change of a water level of a water tank.

8. The water filler in accordance with claim 1, wherein the adjusting unit further includes an elastic positioning seat mounted in the opening of the floating barrel, and a press button movably mounted in the opening of the floating barrel and urged on the positioning seat.

9. The water filler in accordance with claim 8, wherein the support bar is positioned by the positioning seat.

10. The water filler in accordance with claim 1, wherein the press plate has a second end pivotally mounted on an upper end of the support bar.

11. The water filler in accordance with claim 1, wherein the top of the upper cover is formed with two connected side walls each formed with a pivot hole, and the press plate has two sides each provided with a pivot shaft pivotally mounted in the pivot hole of a respective one of the two side walls of the upper cover.

12. The water filler in accordance with claim 11, wherein the pivot shaft is located adjacent to the fist end of the press plate.

13. The water filler in accordance with claim 11, wherein the top of the upper cover is formed with a guide lever located between the two side walls and having a first end located adjacent to the water outlet and a second end extended outward from the upper cover.

14. The water filler in accordance with claim 13, wherein the water support disk is aligned with the second end of the guide lever.

15. The water filler in accordance with claim 1, wherein the upper cover is provided with an oblique guide channel located adjacent to the water outlet, and a guide tube mounted on a distal end of the oblique guide channel and directed toward the outer chamber of the floating barrel, so that water from the water outlet is guided by the oblique guide channel and the guide tube into the outer chamber of the floating barrel.

\* \* \* \* \*